United States Patent
Barnum et al.

(10) Patent No.: US 7,628,262 B2
(45) Date of Patent: *Dec. 8, 2009

(54) ELECTRICAL ACTIVATION OF A VISCOUS CLUTCH

(75) Inventors: Stephen T. Barnum, Portage, MI (US); Michael D. Tuttle, Lake Orion, MI (US)

(73) Assignee: BorgWarner Inc., Auburn Hills, MI (US)

(*) Notice: Subject to any disclaimer, the term of this patent is extended or adjusted under 35 U.S.C. 154(b) by 416 days.

This patent is subject to a terminal disclaimer.

(21) Appl. No.: 11/617,706

(22) Filed: Dec. 28, 2006

(65) Prior Publication Data

US 2007/0119677 A1    May 31, 2007

Related U.S. Application Data

(63) Continuation-in-part of application No. 10/855,131, filed on May 27, 2004, now Pat. No. 7,178,648.

(51) Int. Cl.
  *F16D 31/00*    (2006.01)
(52) U.S. Cl. .................................................. 192/58.61
(58) Field of Classification Search .............. 192/58.61, 192/58.8
See application file for complete search history.

(56) References Cited

U.S. PATENT DOCUMENTS

| | | | | |
|---|---|---|---|---|
| 4,965,545 A | * | 10/1990 | Johnson | 337/140 |
| 5,125,491 A | * | 6/1992 | Takikawa et al. | 192/58.681 |
| 6,725,813 B1 | * | 4/2004 | Boyer | 123/41.44 |
| 6,814,206 B2 | * | 11/2004 | Usui et al. | 192/58.684 |
| 6,851,260 B2 | * | 2/2005 | Mernøe | 60/527 |
| 7,178,648 B2 | * | 2/2007 | Barnum et al. | 192/58.61 |
| 7,503,444 B2 | * | 3/2009 | Bohan | 192/58.61 |

* cited by examiner

Primary Examiner—Dirk Wright (57) ABSTRACT

A system for controlling the engagement and disengagement of a viscous type coupling is accomplished by controlling the relative positioning of a spring loaded valve arm relative to a fluid port through the use of an electrically-activated, temperature-sensitive member, such as a NiTi wire. The characteristics of shape memory alloy materials are such that they are hard above a predetermined temperature, but soft and ductile below a predetermined temperature. When engagement or disengagement of the coupling is desired, electrical current is introduced through the member, therein heating it above a predetermined temperature to harden it. This hardening causes the valve arm to either move to either cover or uncover a fluid port, depending upon the design arrangement of the valve arm relative to the fluid port. A controller coupled to a plurality of engine operating sensors and a power source controls the electrical activation as a function of a desired operating condition.

34 Claims, 4 Drawing Sheets

ELECTRICAL ACTIVATION OF A VISCOUS CLUTCH

CROSS REFERENCE TO RELATED APPLICATIONS

This is a continuation-in-part of application Ser. No. 10/855,131 filed on May 27, 2004, and entitled "Electrical Activation of a Viscous Clutch.

TECHNICAL FIELD

The invention relates generally to fluid coupling systems and more specifically to a electrically activated viscous clutch system.

BACKGROUND ART

The present invention relates to fluid coupling devices, such as viscous drives, the fluid coupling devices being of the type that include both a fluid working chamber and a fluid reservoir chamber, and valving to control the quantity of fluid in the working chamber.

Although the present invention may be used advantageously in various configurations and applications, it is especially advantageous in a coupling device used to drive a radiator cooling fan of an internal combustion engine for an over-the-road truck, such as a Class 8 truck, and will be described in connection therewith.

Viscous drive clutch assemblies have become popular due to their ability to cycle repeat, engage at higher engine speeds, and have varying degrees of engagement. Viscous drives have an operating range of engagement, are generally less engaged at higher engine speeds and are generally more engaged at lower engine speeds.

SUMMARY OF THE INVENTION

The present invention relates to a system for controlling the engagement and disengagement of viscous type clutches. The proposed invention controls the relative positioning of a spring-loaded fill port valve arm through the use of an elongated electrically heated activation mechanism, such as a Nickel-Titanide or nickel-titanium (NiTi) wire, or another shape memory alloy. The characteristics of nickel-titanium wire in particular are such that the nickel-titanium wire is hard above a predetermined temperature, but soft and ductile below a predetermined temperature. Other elongated activation mechanisms, or shape memory alloys, can be electrified and heated causing them to expand, and then allowed to cool and contract, causing a fill port valve to be selectively opened and closed.

This change of proportions of the activation member causes the spring loaded valve arm to move to either cover or uncover a fluid port, depending upon the design arrangement. The covering or uncovering of the fill port thus engages or disengages the viscous clutch, depending upon whether the fluid port is a fill port, used to introduce viscous fluid from a fluid reservoir to a working chamber to engage the clutch, or whether the fluid port is a scavenger port, which removes fluid from the working chamber to the fluid reservoir to disengage the clutch. By coupling the activation mechanism to a power source controlled by a controller, which interprets signals from at least one engine sensor, the engagement or disengagement of the clutch can be precisely controlled based on a myriad of potential engine operating parameters, including but not limited to engine operating temperature. In this way, torque output from the viscous clutch can be precisely controlled to optimize engine performance. The present invention can be utilized in water pumps, fan drives, or any other device having traditional viscous type clutches.

The present invention itself, together with attendant advantages, will be best understood by reference to the following detailed description, taken in conjunction with the accompanying figures.

BEST MODE(S) FOR CARRYING OUT THE INVENTION

Figure 1:
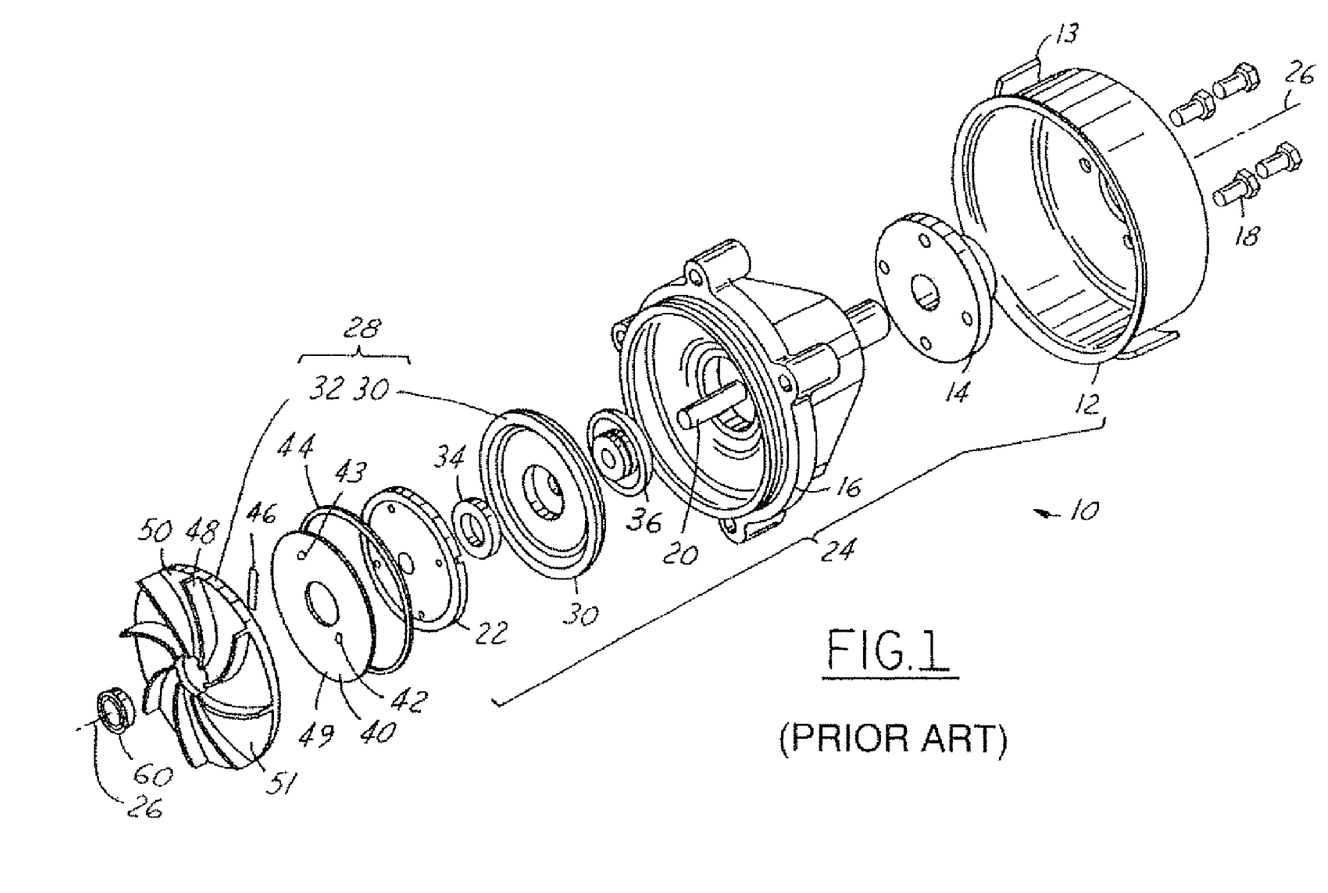
FIG. 1 is an exploded perspective view of a viscous clutch according to the prior art.
Figure 2:
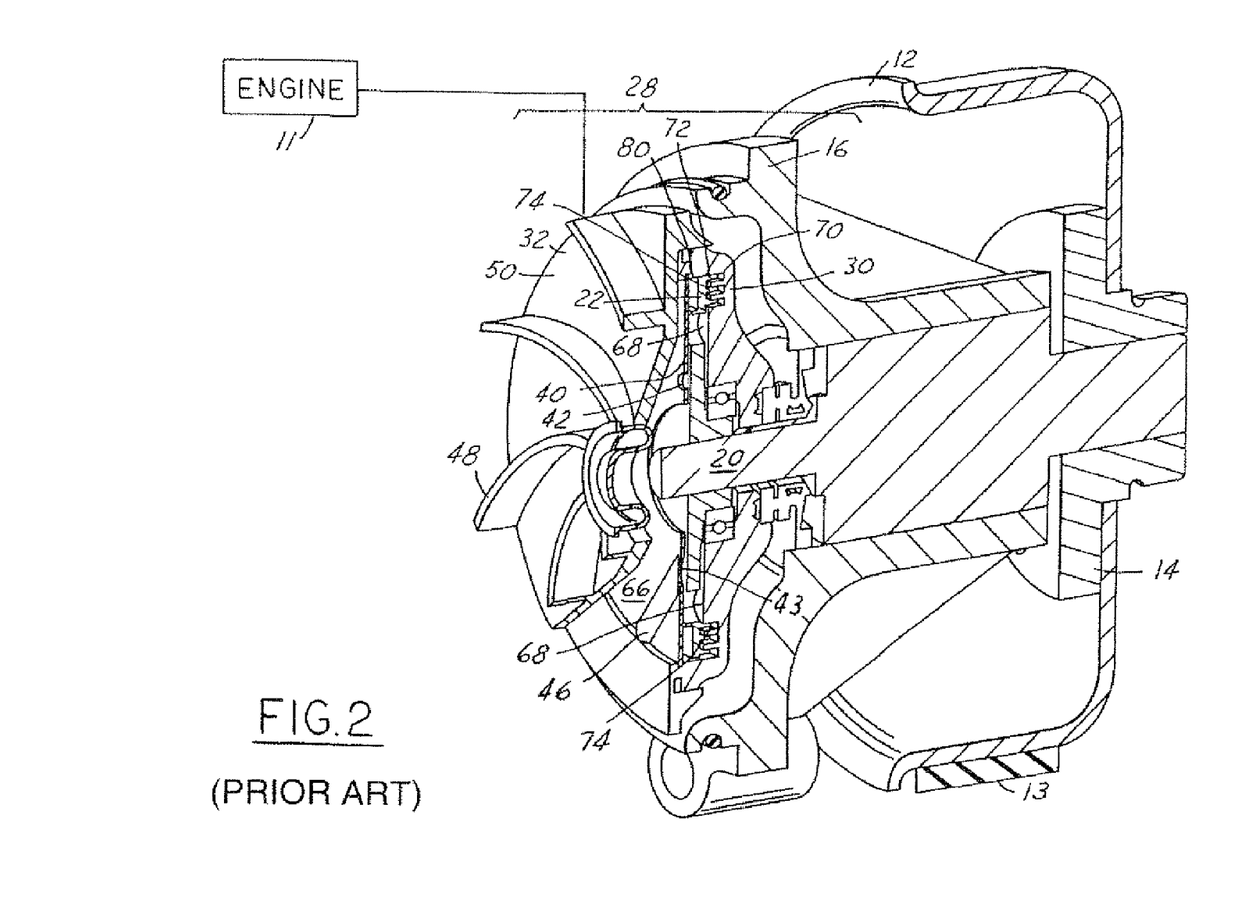
FIG. 2 is a partial section view of the viscous clutch of FIG. 1.

FIGS. 1 and 2 show an exploded and section view of a variable speed viscous clutch 10 made in accordance with the prior art. The viscous clutch 10 has a pulley 12 that is typically connected to the crankshaft of an internal combustion engine via a belt 13. The pulley 12 is coupled to a hub 14 and a water pump housing 16 using a plurality of bolts 18. The housing 16 has a water pump shaft 20 that is coupled to a clutch plate 22. The pulley 12, hub 14 water pump housing 16, water pump shaft 20, and clutch plate 22 collectively form an input member 24. The input member 24 rotates around a central axis 26 defined along the length of the water pump shaft 20 as a function of rotational speed of the belt 13 coupled to the internal combustion engine (not shown).

The clutch plate 22 is contained within an output member 28 that includes a body 30 and an impeller cover 32. The impeller cover 32 has a plurality of impeller blades 48 coupled about its outer surface 50. The impeller blades 48 are contained within a coolant chamber 51. The body 30 is mounted around the water pump shaft 20 using bearing 34. A rotary seal 36 coupled around the water pump shaft 20 between the body 30 and water pump housing 16. A reservoir plate 40 having a fill port 42 and a scavenge hole 43 is also shown coupled around the water pump shaft 20. A gasket 44 seals the cover 32 to the body 30. A bimetallic control element 46 is coupled to the reservoir side 49 of the reservoir plate 40 to cover or uncover the scavenge hole 43. A plug 60 seals the assembly access hole in the impeller cover 32.

A fluid reservoir 66 containing a quantity of viscous fluid (not shown) is also shown as is defined between the impeller cover 32 and reservoir plate 40 that contains the bimetallic control element 46. The viscous fluid may enter an working chamber 68 defined between the reservoir plate 40 and body 30 through fill port 42 when the bimetallic control element 46 is positioned to cover the scavenge hole 43. The working chamber 68 is fluidically coupled to a working chamber 74, The body 30 and clutch plate 22 each have a series of lands 70 and grooves 72 that define a working chamber 74. The viscous fluid is pumped back to the fluid reservoir 40 through scavenge hole 43.

During engine operation, the rotational action of the pulley 12 causes viscous fluid contained within the working chamber 74 to shear at a rate proportional to the speed of rotation of the pulley 12. The shear produces torque that is transmitted to the body 30. The rotation of the body 30 causes rotation of the cover 32, which causes rotation of the impeller blades 48 attached to the cover 32. This causes the movement of coolant within the coolant chamber 51 of the cooling system that is used to cool the engine.

By varying the amount of viscous fluid within the working chamber 74, the amount of torque transmittal will vary and thus will change the rotational speed of the impeller blades 48 used to cool the engine. The amount of viscous fluid entering the working chamber 68, and hence the working chamber 74, is controlled by the bimetallic control element 46, which covers and uncovers the scavenge hole 43 between the fluid reservoir 66 and working chamber 68, depending upon the sensed engine coolant temperature. The bimetallic control element 46 is calibrated with set temperature points for covering or uncovering the scavenge hole 43 prior to the placement of the water pump 10 within the vehicle cooling system.

The bimetallic control element 46 senses engine coolant temperature through conduction of the temperature from the engine coolant through the impeller cover 32. As engine coolant temperature increases, which indicates an increase in engine temperature, the bimetallic control element 46 moves to a position covering the scavenge hole 43, thereby stopping fluid flow from the working chamber 68 to the fluid reservoir 66. This increases the amount of viscous fluid in the working chamber 74 due to flow rate through the fill port 42, thereby generating more torque to drive the output member 28, and hence the impeller blades 48 coupled to the cover 32. The rotation of the impeller blades 48 pumps engine coolant to the engine as a function of impeller blade 48 rotational speed.

Below a calibrated engine coolant temperature, the bimetallic control element 46 moves to uncover the scavenge hole 43, thereby allowing the flow of viscous fluid from the working chamber 68 to the fluid reservoir 66. This decreases the amount of viscous fluid, and hence the shear created within the working chamber 74. This decreases the amount of torque generated to rotate the output member 28. This in turn decreases the pumping rate of engine coolant to the engine While the above viscous type system is illustrated for a water pump, one of ordinary skill in the art recognizes that bimetallic control elements such as that shown in FIGS. 1 and 2 can also be used on a wide variety of other devices utilizing a viscous clutch system. For example, the clutching arrangement described above is also used in viscous type fan drives, in which the bimetallic element is used to control opening and closing of valve arms that ultimately control the rotational rate of a fan coupled to the fan drive. One problem with these type of systems is that the opening and closing of the valve arms is temperature dependent, and not idealized based upon other engine performance characteristics besides temperature. As such, the valve arms may allow fluid flow through the scavenge hole 43 at times when increased torque is desirable.

The present invention, as described below in FIGS. 3-8, proposes various embodiments for controlling the relative positioning of a valve arm(s) for use in viscous clutch systems that controls the positioning electronically based upon numerous engine performance factors, including temperature. One embodiment of the proposed invention controls the relative positioning of a spring loaded fill port valve arm(s) through the use of an electrically heated member, such as a nickel-titanide, or nickel-titanium (NiTi) wire. The characteristics of nickel-titanium wire are such that the nickel-titanium wire is hard above a predetermined temperature, but soft and ductile below a predetermined temperature.

Although the actuation member herein is referred to in some instances as a "wire," it is to be understood that such member can be any elongated member which changes its length due to electrical and/or thermal activation. For instance, the member could be a metal which has a significant expansion characteristic when electrically activated. The member also could be an elongated hollow tubular member and made from a metal or composite material. In addition, if the activation member is a wire, then it could be any of the typical forms of a wire member, such as a braided wire, a solid wire, a wire formed of a plurality of strands, and the like.

The activation member can also be made from a shape memory alloy. These are materials that have the ability to return to previously defined shapes and sizes where subjected to an appropriate thermal procedure. Generally, these materials can be plastically deformed at some relatively low temperature, and upon exposure to some higher temperature, will return to their shape prior to the deformation. Other than nickel-titanium alloys, the preferred shape memory alloys which can be used with the present invention include the copper-base alloys such as CuZnA1 and CuAINi. Other materials which possibly can be used are set forth in the article entitled "Shape Memory Alloys" (SMA paper), the disclosure of which is hereby incorporated by reference herein.

Referring now to FIGS. 3-6, a valve arm 82 is shown and pivotally coupled to a reservoir plate 86 via a coupling pin 88. A coil spring 84 is coupled around the coupling pin 88. The spring 84 is loaded to maintain the valve arm 82 in a closed position covering a fluid port 90 located within the reservoir plate 86. The fluid port 90 is representative of either the fill port 42 or scavenge hole 43 of FIGS. 1 and 2, and thus relative positioning of the valve arm 82 may be used to control fluid flow from the working chamber 68 to the fluid reservoir, or vice versa, depending upon the arrangement desired.

An elongated electrically activated member 92 is coupled at one end 94 to an outward portion 83 of the valve arm 82 and at an opposite end 96 to a coupling pin 88. If nickel-titanium wire is utilized as the electrically heated member, then because it is hard above a predetermined temperature, and soft and ductile below a predetermined temperature, the environment surrounding the reservoir plate is thus maintained below that predetermined temperature. The outward portion 83 of the valve arm 82 may be integrally formed with the valve arm 82 or alternatively coupled to the valve arm 82 and is located to cover and uncover fluid port 90.

A series of control posts 98 coupled to the reservoir plate 86 and spaced circumferentially around the valve arm 82 are used to maintain the member 92 in a taut arrangement. A first electrical connection 100 is also coupled to the outward portion 83 of the valve arm 82. A second electrical connection 102 is coupled to the reservoir plate 86 to complete an electrical circuit running from connection 100, through the outward portion 83, through member 92, through the coupling pin 88, to reservoir plate 86 and back to electrical connection 102.

The first 100 and second electrical connection 102 are electrically coupled to a power source 104 having a controller 106. The controller 106 receives input signals from a variety of sensors 108 that measure various engine operating parameters, including but not limited to engine operating temperature and engine operating conditions (such as engine idle, fuel economy etc.) and directs the power source 104 to introduce current to the member 92 through connector 100 depending upon the desired engine operating conditions.

Figure 3:
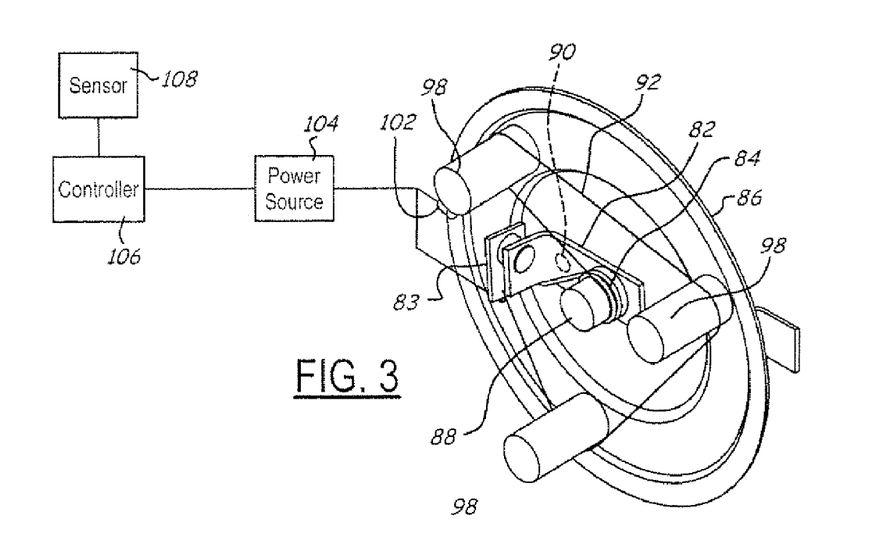
FIG. 3 is a perspective view of an activation wire system coupled to a valve arm that could be used in the viscous type water pump of FIGS. 1 and 2 according to one preferred embodiment of the present invention.
Figure 4:
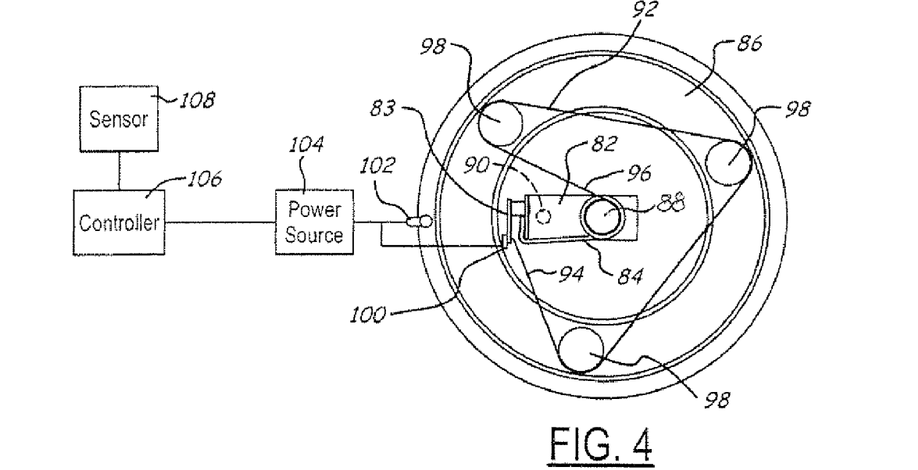
FIG. 4 is a front view of FIG. 3 wherein the valve arm is covering the scavenge hole.
Figure 5:
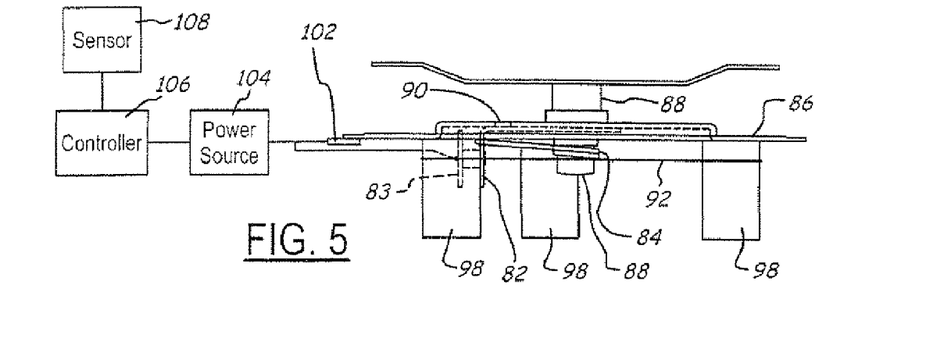
FIG. 5 is a side view of FIG. 4.

When disengagement of the viscous clutch is desired, as sensed by the sensor 108 and signaled to the controller 106, the controller 106 directs the power source 104 to turn off the current, and the member 92 remains in an unstressed and unstretched condition. This is shown in FIGS. 3-5. The steel spring 84 urges the valve arm 82 to cover (i.e. close) the fill port 42, therein preventing viscous fluid form entering the working chamber 68 from the fluid reservoir 66 to engage the clutch and output member 28. In the case of a water pump as shown in FIGS. 1 and 2, the engagement of the output member 28 rotates the impellers 48 to provide coolant flow through the cooling system to cool the engine. In the case of a fan drive (not shown), the engagement of the output member rotates a fan coupled to the output member and having a plurality of fan blades, which would therein provide cooling airflow through the cooling system.

Figure 6:
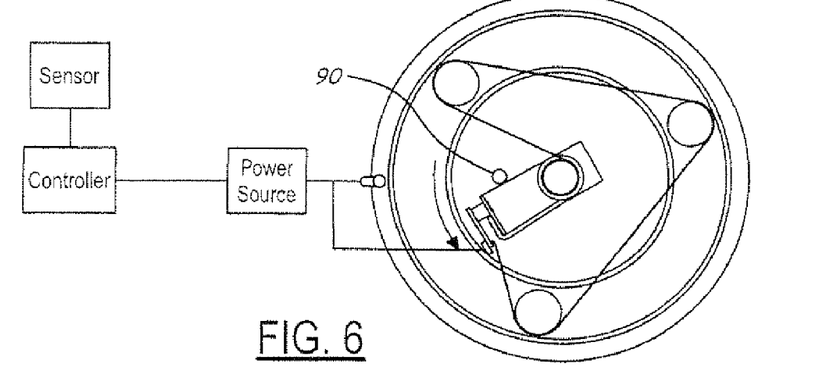
FIG. 6 is a front view of FIG. 3 wherein the valve arm is positioned to uncover the scavenge hole.

When electricity is introduced through the member 92, as shown in FIG. 6, the member 92 heats up above the predetermined temperature. If the member 92 is a NiTi wire or the equivalent, then it will harden and increase in tension around the control posts 98. The tension of the wire 92 overcomes the force of the spring 84 and pivots the valve arm 82 to uncover the fluid port 90 (i.e. moves the valve arm to an open position), This allows viscous fluid to flow between the working chamber 68 and the fluid reservoir 66 and to engage the clutching mechanism to drive the output member, In the case wherein the fluid port 90 is the equivalent of fill port 42 of FIGS. 1 and 2, and when engagement of the viscous clutch is desired, as shown in FIG. 6, the hardening causes the valve arm 82 to move to uncover the fill port 42, therein allowing viscous fluid from entering the working chamber 68 from the fluid reservoir 66 to engage the viscous clutch and rotate the output member 28. This allows the rotation of the impellers 48 to provide coolant flow to cool the engine, wherein the clutch is coupled within a water pump. In a fan drive, the introduction of viscous fluid allows rotation of the fan blades, therein providing cooling airflow to the radiator to provide cooling the engine.

The arrangement as shown in FIGS. 3-6 is such that the clutch is failsafe closed. However, in alternative embodiments, the arrangement could be failsafe open, in which the valve arm is spring-loaded such that the fill port 42 remains open to engage the clutch in the absence of electrical activation of the wire 92.

Further, in alternative embodiments, as opposed to controlling the opening and closing of the fill port 42., the same device could be utilized to control the opening and closing of the scavenger port 43. Thus, viscous fluid could be controlled from leaving the operating chamber. Thus, wherein the valve arm 82 is set according to the failsafe closed arrangement of FIGS. 3-6, the clutching mechanism in this embodiment is operated in a failsafe engaged mode, wherein viscous fluid is maintained in the operating chamber in the absence of electrical activation of the member 92.

Further, yet another preferred embodiment could couple the member 92 to a multi-arm valve that simultaneously controls the opening and closing of the fill port 42 and scavenger port 43. Thus, the multi-arm valve could be moved from one position, in which fluid may flow through the fill port 42 but not through the scavenger port 43, to a second position, wherein fluid may flow through the scavenger port 43 but not through the fill port 42, to control the engagement of the clutch used to drive a water pump or fan drive.

Finally, it is also contemplated that the opening and closing of the fill port 42 and scavenger port 43 may be controlled by two separate valve arm and electrically activated member arrangements. The controller 106 could then direct current flow through one or both members to control the relative positioning of the respective valve arm to cover or uncover the fill port and scavenger port, therein more precisely controlling the engagement of the clutch used to drive the output member in the water pump or fan drive.

Of course, in alternative embodiments, the valve arm and elongated member arrangement described above could be coupled with the scavenger port 43 instead of with the fill port 42 as described above. In this alternative embodiment, viscous fluid would be prevented from returning from the operating chamber 68 to the fluid reservoir 66 during operation when the valve arm 82 covers the scavenger port 43, therein maintaining the clutch in engagement mode. Depending upon the failsafe position, wherein the member 92 is not activated with current, the clutch could be maintained in engagement mode or maintained in a disengaged mode (wherein viscous fluid is continually exiting the operating chamber through the scavenger port).

Figure 7:
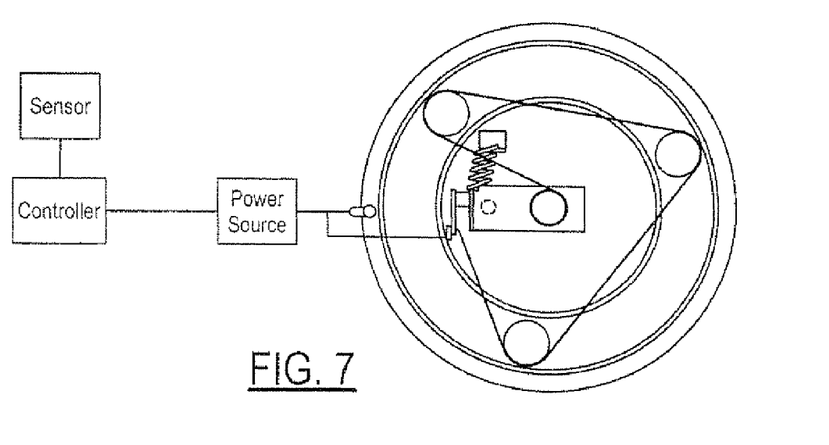
FIGS. 7-8 disclose an alternate embodiment of the invention.
Figure 8:
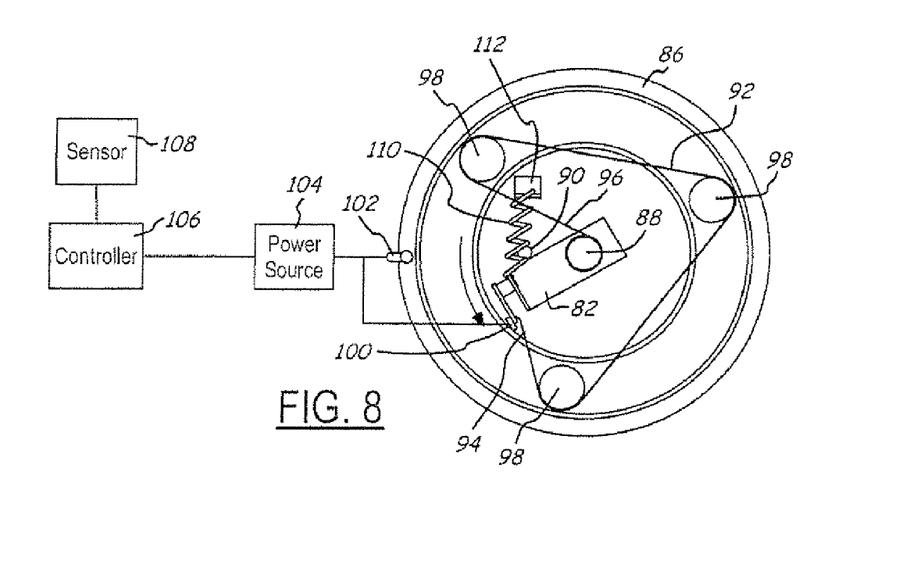

Referring now to FIGS. 7-8, an alternative preferred embodiment is presented wherein a valve arm 82 is pivotally coupled to a reservoir plate 86 via a coupling pin 88. A spring 110 is coupled to a stop 112 and loaded against the valve arm 82 (or coupled to the valve arm 82) to maintain the valve arm 82 in an closed position covering a fluid port 90 located within the reservoir plate 88.

When disengagement of the viscous clutch is desired, the controller 106 directs the power source 104 to turn off the current, and the member 92 remains soft. This is shown in FIG. 7. The spring 110 attached to the valve arm 82 thus urges the valve arm 82 to cover (i.e. close) the fluid port 90.

When electricity is introduced through the member 92, as shown in FIG. 8, the member 92 heats up above the predetermined temperature. This causes the member 92 to harden and increase in tension around the control posts 98. The tension of the member 92 overcomes the force of the spring 10 and pivots the valve arm 82 to uncover the fluid port 90. This allows fluid to flow between the working chamber 68 and fluid reservoir 66.

The fluid port 90 is representative of either the fill port 42 or scavenge hole 43 of FIGS. 1 and 2, and thus relative positioning of the valve arm 82 may be used to control fluid flow from the working chamber 68 to the fluid reservoir 66, or vice versa, depending upon the arrangement desired.

The present invention relates to a system for controlling the engagement and disengagement of a viscous type clutches. The proposed invention controls the relative positioning of a spring loaded fill port valve arm through the use of an electrically activated member, such as a wire made from a nickel-titanium alloy, a copper based alloy, or the like. Preferred metals are nickel-titanide or nickel-titanium (NiTi) wire. The characteristics of these materials are such that the wire is hard above a predetermined temperature, but soft and ductile below a predetermined temperature. By coupling the wire to a power source controlled by a controller, which interprets signals from at least one engine sensor, the engagement or disengagement of the viscous type clutch can be precisely controlled based on a myriad of potential engine operating parameters, including but not limited to engine operating temperature. In this way, torque output from the viscous clutch can be precisely controlled to optimize engine performance. The viscous clutch of the present invention can be introduced within water pumps, fan drives, or any other device utilizing traditional viscous type clutches.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A viscous coupling comprising:
    an output member;
    an input member coupled within said output member;
    a working chamber defined between said output member and said input member;
    a reservoir plate coupled between within said output member and between said input member and said output member, said reservoir plate having a first side and a second side;
    a fluid reservoir defined between said first side and said output member, said fluid reservoir having a quantity of viscous fluid;
    an operating chamber defined between said second side and said output member;
    a fluid port on said reservoir plate fluidically coupling said working chamber and said fluid reservoir;
    a spring loaded valve arm pivotably coupled to said first side of said reservoir plate; and
    an electrically-activated, temperature-sensitive elongated member coupled to said spring loaded valve arm for controlling the relative positioning of said spring loaded valve arm to cover and uncover said fluid port.

2. The viscous coupling of claim 1 further comprising:
    a power source coupled to said electrically-activated, temperature-sensitive member; and
    a controller coupled to said power source, said controller directing said power source to supply electricity to said electrically activated, temperature-sensitive member as a function of an engine operating condition.

3. The viscous coupling of claim 1, wherein said electrically activated, temperature-sensitive member comprises a nickel-titanium wire.

4. The viscous coupling of claim 1, wherein said electrically activated, temperature-sensitive member covers said fluid port when activated with electrical current.

5. The viscous coupling of claim 1, wherein said electrically activated, temperature-sensitive member uncovers said fluid port when activated with electrical current.

6. The viscous coupling of claim 1, wherein said fluid port comprises a scavenger port.

7. The viscous coupling of claim 1, wherein said fluid port comprises a fill port.

8. The viscous coupling of claim 1, wherein said spring loaded valve arm comprises:
    a valve arm pivotally coupled to said first side of said reservoir plate via a coupling pin;
    a coil spring coupled around said coupling pin, said coil spring urging said valve arm to a first position, said first position selected from the group consisting of a closed position and an open position, said closed position defined wherein said valve arm covers said fluid port and said open position defined wherein said valve arm does not cover said fluid port.

9. The viscous coupling of claim 1, wherein said spring loaded valve arm comprises:
    a valve arm pivotally coupled to said first side of said reservoir plate via a coupling pin;
    a stop coupled to said first side of said reservoir plate;
    a spring coupled to said stop and located between said valve arm and said stop, said spring urging said valve arm to a first position, said first position selected from the group consisting of a closed position and an open position, said closed position defined wherein said valve arm covers said fluid port and said open position defined wherein said valve arm does not cover said fluid port.

10. The viscous coupling of claim 9, wherein said spring is affixed to said valve arm.

11. A method for precisely controlling the torque output of a viscous coupling comprising;
    (a) providing a viscous coupling comprising:
    an output member;
    an input member coupled within said output member;
    a working chamber defined between said output member and said input member;
    a reservoir plate coupled between within said output member and between said input member and said output member, said reservoir plate having a first side and a second side;
    a fluid reservoir defined between said first side and said output member, said fluid reservoir having a quantity of viscous fluid;
    an operating chamber defined between said second side and said output member;
    a fluid port on said reservoir plate fluidically coupling said working chamber and said fluid reservoir;
    (b) coupling a spring loaded valve arm to said reservoir plate such that said spring loaded valve arm is urged to a first position, said first position selected from the group consisting of an open position and a closed position, said closed position defined wherein said spring loaded valve arm covers said fluid port and said open position defined wherein said spring loaded valve arm does not cover said fluid port;
    (c) coupling an electrically activated, temperature-sensitive member to said spring loaded valve arm;
    (d) coupling said electrically-activated, temperature-sensitive member to a power source; and
    (e) controlling the relative positioning of said valve arm between said closed position and said open position by introducing an electrical current from said power source through said electrically-activated, temperature-sensitive wire.

12. The method of claim 11, wherein (e) controlling the relative positioning of said valve arm comprises:
    (e) heating said electrically-activated, temperature-sensitive member above a predetermined temperature by introducing an electrical current through said electrically-activated, temperature-sensitive member, wherein said electrically-activated, temperature-sensitive member hardens above said predetermined temperature and causes said valve arm to move from said first position to a second position,
    wherein said second position comprises said open position when said first position comprises said closed position and wherein said second position comprises said closed position when said first position comprises said open position.

13. The method of claim 11, wherein (b) coupling a spring loaded valve arm to said reservoir plate comprises:
    coupling a coil spring around a coupling pin:
    coupling said valve arm to said first side of said reservoir plate using said coupling pin, wherein said coil spring urges said valve arm to a first position, said first position selected from the group consisting of an open position and a closed position, said closed position defined wherein said valve arm covers said fluid port and said open position defined wherein said valve arm does not cover said fluid port.

14. The method of claim 11, wherein (b) coupling a spring loaded valve arm to said reservoir plate comprises:
coupling a stop to a first side of said reservoir plate;
coupling a valve arm to said first side of said reservoir plate using a coupling pin;
coupling a spring to said stop in a position between said stop and said valve arm, said spring urging said valve arm to a first position, said first position selected from the group consisting of an open position and a closed position, said closed position defined wherein said valve arm covers said fluid port and said open position defined wherein said valve arm does not cover said fluid port.

15. The method of claim 14, wherein (b) coupling a spring loaded valve arm to said reservoir plate further comprises affixing said spring to said valve arm.

16. The method of claim 11, wherein (e) controlling the relative positioning of said valve arm comprises:
electrically coupling a controller to said power source; and
controlling the relative positioning of said valve arm between said closed position and said open position by introducing a signal from said controller to said power source to introduce an electrical current from said power source through said electrically-activated, temperature-sensitive wire.

17. The method of claim 16, wherein (e) controlling the relative positioning of said valve arm further comprises:
electrically coupling at least one sensor to said controller;
measuring an operating parameter using said at least one sensor;
sending a first signal from said at least one sensor to said controller as a function of said measured operating parameter; and
controlling the relative positioning of said valve arm between said closed position and said open position by introducing a second signal from said controller to said power source to introduce an electrical current from said power source through said electrically-activated, temperature-sensitive member, said second signal being a function of said first signal.

18. The method of claim 11 further comprising (f) coupling the viscous coupling within a fan drive system.

19. The method of claim 11 further comprising (f) coupling the viscous coupling within a water pump system.

20. The method of claim 11, wherein (c) coupling an electrically-activated, temperature-sensitive member to said spring loaded valve arm comprises coupling an nickel-titanium wire to said spring loaded valve arm.

21. A viscous clutch comprising:
a reservoir plate separating a fluid reservoir from a working chamber;
a fluid hole contained within said reservoir plate, said fluid hole fluidically coupling said fluid reservoir and said working chamber;
a spring loaded valve arm pivotally coupled to said first side of said reservoir plate; and
an electrically-activated, temperature-sensitive member coupled to said spring loaded valve arm for controlling the relative positioning of said spring loaded valve arm to cover and uncover said fluid port.

22. The viscous clutch of claim 21, wherein said spring loaded valve arm comprises:
a valve arm pivotally coupled to said first side of said reservoir plate via a coupling pin;

a coil spring coupled around said coupling pin, said coil spring urging said valve arm to a first position, said first position selected from the group consisting of a closed position and an open position, said closed position defined wherein said valve arm covers said fluid port and said open position defined wherein said valve arm does not cover said fluid port.

23. The viscous clutch of claim 22, wherein said spring loaded valve arm comprises:
a valve arm pivotally coupled to said first side of said reservoir plate via a coupling pin;
a stop coupled to said first side of said reservoir plate;
a spring coupled to said stop and located between said valve arm and said stop, said spring urging said valve arm to a first position, said first position selected from the group consisting of a closed position and an open position, said closed position defined wherein said valve arm covers said fluid port and said open position defined wherein said valve arm does not cover said fluid port.

24. The viscous clutch of claim 23, wherein said spring is affixed to said valve arm.

25. The viscous clutch of claim 21 further comprising:
a power source coupled to said electrically-activated, temperature-sensitive member; and
a controller coupled to said power source, said controller directing said power source to supply electricity to said electrically activated, temperature-sensitive member as a function of an engine operating condition.

26. The viscous clutch of claim 21 wherein said electrically activated, temperature-sensitive member comprises a nickel-titanium wire.

27. The viscous clutch of claim 21, wherein said electrically activated, temperature-sensitive member covers said fluid port when activated with electrical current.

28. The viscous clutch of claim 21, wherein said electrically activated, temperature-sensitive member uncovers said fluid port when activated with electrical current.

29. The viscous clutch of claim 21, wherein said fluid port comprises a scavenger port.

30. The viscous clutch of claim 21, wherein said fluid port comprises a fill port.

31. A viscous coupling comprising:
an output member;
an input member coupled within said output member;
a working chamber defined between said output member and said input member;
a reservoir plate coupled between within said output member and between said input member and said output member, said reservoir plate having a first side and a second side;
a fluid reservoir defined between said first side and said output member, said fluid reservoir having a quantity of viscous fluid;
an operating chamber defined between said second side and said output member;
a fluid port on said reservoir plate fluidically coupling said working chamber and said fluid reservoir;
a spring loaded valve arm pivotably coupled to said first side of said reservoir plate; and
an elongated shape memory alloy member coupled to said spring loaded valve arm for controlling the relative positioning of said spring loaded valve arm to cover and uncover said fluid port.

32. The viscous coupling of claim 31 further comprising:
a power source coupled to said shape memory alloy member; and
a controller coupled to said power source, said controller directing said power source to supply electricity to said shape memory alloy member as a function of an engine operating condition.

33. The viscous coupling of claim 31 wherein said shape memory alloy member is a nickel-Titanide or nickel-Titanium wire member.

34. The viscous coupling of claim 31 wherein said shape memory alloy member is a copper-base alloy.

* * * * *